United States Patent
Yerushalmy et al.

(10) Patent No.: US 11,961,331 B1
(45) Date of Patent: Apr. 16, 2024

(54) SYSTEMS FOR IMPROVING POSE DETERMINATION BASED ON VIDEO DATA

(71) Applicant: AMAZON TECHNOLOGIES, INC., Seattle, WA (US)

(72) Inventors: Ido Yerushalmy, Tel-Aviv (IL); Michael Chertok, Raanana (IL); Sharon Alpert, Rehovot (IL)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 322 days.

(21) Appl. No.: 17/446,390

(22) Filed: Aug. 30, 2021

(51) Int. Cl.
G06V 40/20 (2022.01)
G06N 20/00 (2019.01)
G06T 7/73 (2017.01)
G06V 10/98 (2022.01)
G06V 20/40 (2022.01)

(52) U.S. Cl.
CPC ............. *G06V 40/23* (2022.01); *G06N 20/00* (2019.01); *G06T 7/73* (2017.01); *G06V 10/993* (2022.01); *G06V 20/46* (2022.01); *G06T 2207/10016* (2013.01); *G06T 2207/20081* (2013.01)

(58) Field of Classification Search
CPC ...... G06V 40/23; G06V 10/993; G06V 20/46; G06T 7/73; G06T 2207/10016; G06T 2207/20081
See application file for complete search history.

(56) References Cited

U.S. PATENT DOCUMENTS

2016/0086016 A1\* 3/2016 Suh ..................... G06V 40/165
382/118

\* cited by examiner

*Primary Examiner* — Diane D Mizrahi
(74) *Attorney, Agent, or Firm* — Lindauer Law, PLLC

(57) ABSTRACT

A first computing device acquires video data representing a user performing an activity. The first device uses a first pose extraction algorithm to determine a pose of the user within a frame of video data. If the pose is determined to be potentially inaccurate, the user is prompted for authorization to send the frame of video data to a second computing device. If authorization is granted, the second computing device may use a different algorithm to determine a pose of the user and send data indicative of this pose to the first computing device to enable the first computing device to update a score or other output. The second computing device may also use the frame of video data as training data to retrain or modify the first pose extraction algorithm, and may send the modified algorithm to the first computing device for future use.

20 Claims, 7 Drawing Sheets

SYSTEMS FOR IMPROVING POSE DETERMINATION BASED ON VIDEO DATA

BACKGROUND

Videos may be used to provide instructional content for performance of various activities, such as fitness exercises. Videos may also be used to evaluate performance of an activity by a participant. For example, video data that represents a participant performing an activity may be acquired using a camera, and the positions of the participant's body during performance of the activity may be used to evaluate the performance, provide feedback, and so forth. However, various conditions may cause potential inaccuracy in the determined positions of a participant's body.

BRIEF DESCRIPTION OF FIGURES

The detailed description is set forth with reference to the accompanying figures. In the figures, the left-most digit(s) of a reference number identifies the figure in which the reference number first appears. The use of the same reference numbers in different figures indicates similar or identical items or features.

Figure 1A:
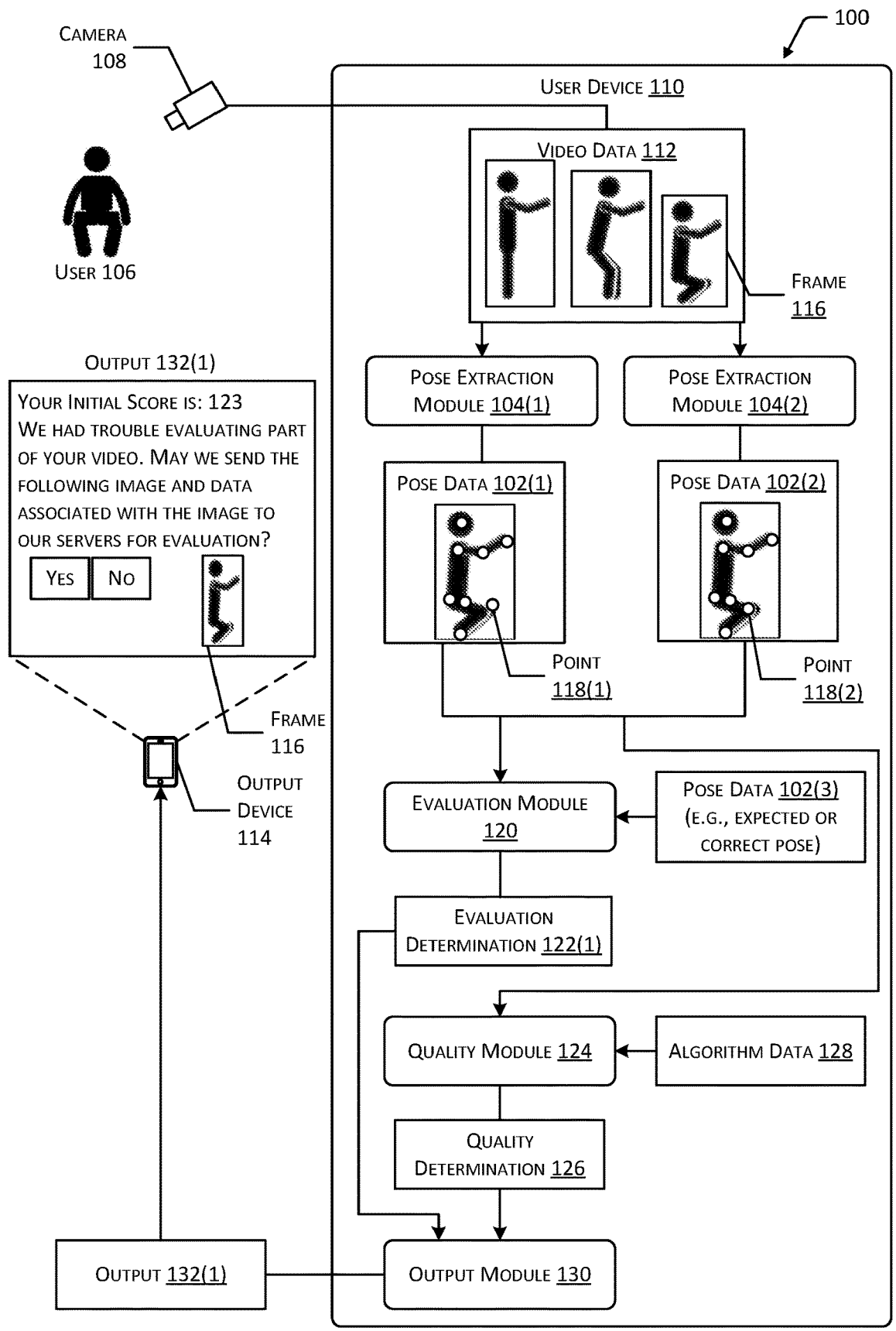
FIGS. 1A-1C depict an implementation of a system for determining improved pose data and pose extraction algorithms in response to potentially inaccurate pose data.

While implementations are described in this disclosure by way of example, those skilled in the art will recognize that the implementations are not limited to the examples or figures described. It should be understood that the figures and detailed description thereto are not intended to limit implementations to the particular form disclosed but, on the contrary, the intention is to cover all modifications, equivalents, and alternatives falling within the spirit and scope as defined by the appended claims. The headings used in this disclosure are for organizational purposes only and are not meant to be used to limit the scope of the description or the claims. As used throughout this application, the word "may" is used in a permissive sense (i.e., meaning having the potential to) rather than the mandatory sense (i.e., meaning must). Similarly, the words "include", "including", and "includes" mean "including, but not limited to".

DETAILED DESCRIPTION

Videos may be used to provide instruction to users for performance of various types of activities. For example, a video may depict an instructor performing a fitness exercise while providing verbal instruction. A user may attempt to perform the exercise, assisted by the visual performance and verbal instruction presented in the video. In some cases, the user may perform an activity within a field of view of a camera, and video data representing performance of the activity by the user may be acquired. The acquired video data may be used to evaluate performance of the activity by the user, such as by comparing the positions of the user's body at various points in time to correct or expected positions. For example, an output presented after completion of an activity by a user may include a score, corrective feedback, positive reinforcement, or other information based on correspondence between the movement and positions of the user's body and the correct or expected positions.

In some cases, the positions of a user's body that are determined using acquired video data may be subject to inaccuracy. For example, a device may use one or more pose extraction algorithms to determine the pose of a user in a frame of video data. The pose of a user may be represented by a set of points, each point representing the location and orientation of a body part or joint of the user, such as positions of the user's knees, feet, hips, head, and so forth. Pose extraction algorithms may use various computer vision and image analysis techniques to determine locations of body parts of the user. For example, segmentation techniques may be used to differentiate between human forms and background objects. Feature extraction techniques, which may include various computer vision and object recognition techniques, as well as use of machine learning systems such as deep convolutional neural networks (CNNs), may be used to identify estimated locations of particular body parts. Various rules may constrain the locations and orientations of one or more points of a pose relative to one or more other points. Pose extraction algorithms executed on personal computing devices, such as smartphones, may use a limited set of techniques to enable computationally efficient processing of a large number of frames of video data. Different pose extraction algorithms may exhibit larger or smaller amounts of inaccuracy under various conditions. For example, a particular pose extraction algorithm may exhibit inaccuracy during low light conditions, while another pose extraction algorithm may exhibit inaccuracy if a portion of a user's body is outside of the field of view of a camera, and a third pose extraction algorithm may exhibit inaccuracy if the user's body performs certain types of movement. Inaccuracies in the determination of poses based on video data may reduce the effectiveness of instruction, feedback, and other information provided to a user.

Described in this disclosure are techniques for improving the accuracy of pose data determined using a computing device. A first computing device is used to acquire video data representing a user performing an activity. For example, the first computing device may include a smartphone, a personal computing device, or another type of computing device that includes a camera or that receives data from a separate camera. The first computing device determines pose data based on the acquired video data. The first computing device may use one or more pose extraction algorithms to determine pose data. For example, for a particular frame of the video data, a first pose extraction algorithm may be used to determine first pose data representing a first pose of the user, a second pose extraction algorithm may be used to determine second pose data representing a second pose of the user, and so forth. Each determined pose may be represented by a set of points, each point representing a location of a respective body part of the user. Additional data indicative of the position of the user may also be determined, such as data indicative of the movement of one or more body parts of the user between frames of video data.

In some cases, one or more of the determined poses may be subject to potential inaccuracy. For example, a pose determined by a first pose extraction algorithm may differ from the poses determined by one or more second pose extraction algorithms by more than a threshold value. Continuing the example, a location of a point representing the position of a body part of the user in a pose determined using a first algorithm may differ from the location of a corresponding point in a pose determined using a second algorithm by at least a threshold distance. In other implementations, one or more other analysis techniques, such as data indicative of the movement between frames of video data, may be used to determine a potential inaccuracy in a determined pose. For example, movement data may indicate movement of a particular body part of a user between one or more frames of video data, while the poses determined for the frames of data may not represent the same movement indicated in the movement data. In some cases, the pose data determined by a pose extraction algorithm may be associated with a confidence value, and potential inaccuracy may be determined based on the confidence value being less than a threshold value. For example, one or more points representing body parts of a user may be associated with statistical values, and if one or more statistical values for a point in a particular frame differ by more than a threshold value from the statistical value(s) for the point in one or more other frames, this may indicate that the point in the particular frame is subject to inaccuracy. In some cases, potential inaccuracy of an algorithm may be determined based on one or more characteristics of the frame of video data, such as types of lighting, color, movement, the presence or absence of background objects, and so forth. If the characteristics correspond to algorithm data indicative of conditions associated with inaccuracy in an algorithm, this may indicate potential inaccuracy. For example, a particular pose extraction algorithm may be known to exhibit inaccuracy when determining a pose during certain types of movement.

When potential inaccuracy of a pose determined using a pose extraction algorithm is determined for a frame of video data, an output may be presented requesting authorization from the user to send that frame of video data, or a portion of the frame, to a different computing device, such as one or more servers associated with maintenance of pose extraction algorithms. In cases where potential inaccuracies associated with multiple frames of video data are determined, the output may include a user interface enabling a user to select one or more frames for which authorization is to be provided or declined, such as by presenting multiple frames in a gallery view. In some implementations, a portion of a frame associated with a potential inaccuracy may be determined, and authorization may be requested to send the portion of the frame, rather than the entire frame, to one or more other computing devices. For example, a pose extraction algorithm may exhibit potential inaccuracy determining the location of the left knee of a user within a frame of video data, and the portion of the frame that includes the left knee, such as a bounded rectangle, may be determined. Authorization may then be acquired to send the determined portion of the frame. In some cases, sending of the portion of the frame may include sending the frame of video data with regions other than the determined portion of the frame blurred or otherwise obscured. In some implementations, authorization may also be acquired to send other data that may be determined based on the video data, such as data indicative of movement of the user's body, data indicative of lighting or background conditions, data indicative of the quality or confidence of determined pose data, and so forth.

In response to input providing authorization, the frame(s) or portion(s) of frame(s) may be sent to one or more second computing devices, such as one or more servers. The second computing device(s) may determine pose data based on the received frame(s) of video data using one or more different pose extraction algorithms. For example, a server may execute pose extraction algorithms that use a greater quantity of computational resources than a smartphone owned by a user, which may enable more accurate determination of a pose of the user. The determined pose data may then be sent to the first computing device, which may use the pose data for presentation of an output. For example, the first computing device may present a first output based on pose data determined by pose extraction algorithms executing on the first computing device. The first output may include a score or other type of evaluation based on correspondence between the determined pose data and correct or expected poses. After additional pose data is received from the second computing device(s), the score or other type of output may be updated based on the additional pose data. For example, if pose data determined using a first algorithm is potentially inaccurate, pose data received from one or more servers that was determined using a more accurate pose extraction algorithm may be used to replace the potentially inaccurate pose data, and a new score or output may be determined.

Additionally, in some implementations, the second computing device(s) may be used to train or modify potentially inaccurate pose extraction algorithms. For example, if a first pose extraction algorithm used by the first computing device determines pose data that is potentially inaccurate for a frame of video data, the second computing device(s) may use the frame as training data for retraining or modifying a copy of the first pose extraction algorithm. Continuing the example, a frame and the pose data determined by the first computing device may be used as a negative or inaccurate sample of data. Based on data from the first computing device, and in some cases, frames of video data from other computing devices for which potentially inaccurate pose data was determined using the first pose extraction algorithm, the first pose extraction algorithm may be trained or otherwise modified. The modified pose extraction algorithm may then be sent to the first computing device for future use. In some implementations, the second computing device(s) may send one or more additional pose extraction algorithms to the first computing device based on characteristics of the received frame(s) of video data. For example, if a frame of video data received from the first computing device includes a certain characteristic, such as low lighting conditions, an additional pose extraction algorithm that is suitable for use with the determined characteristic may be sent to the first computing device.

Acquiring authorization from a user prior to sending one or more frames of video data to a server or other computing device may preserve the privacy of the user, while enabling more accurate output to be determined and presented, and enabling performance of pose extraction algorithms to be improved. As a result, the user experience may be improved by providing more accurate output, while also improving future performance of algorithms used by a user's device. For example, a frame of video data may include the physical appearance of the user, an appearance of a location associated with the user, one or more background objects or other individuals, and so forth. Presenting an output that enables the user to view each frame before providing authorization may enable the user to select particular frames to send or to retain as private. Identifying particular frames, or portions of frames, associated with potentially inaccurate pose data and requesting authorization to send only those frames or portions of frames to a server may further protect the privacy of the user by sending only the data that may be useful to improve the output presented to the user or to improve the pose extraction algorithms used by the first computing device, while retaining other data as private. In some implementations, in cases where authorization to send a frame of video data is not acquired, other data that does not implicate the privacy of the user may be determined and sent. For example, motion flow data that represents movement of pixels within frames of video data may be determined and used to improve the accuracy of an output presented to the user or to modify a pose extraction algorithm. In some implementations, motion flow data may be determined and sent in addition to a frame of video data when authorization to send the frame is acquired. As another example, lighting data indicative of lighting conditions associated with video data may be determined and sent.

Figure 1B:
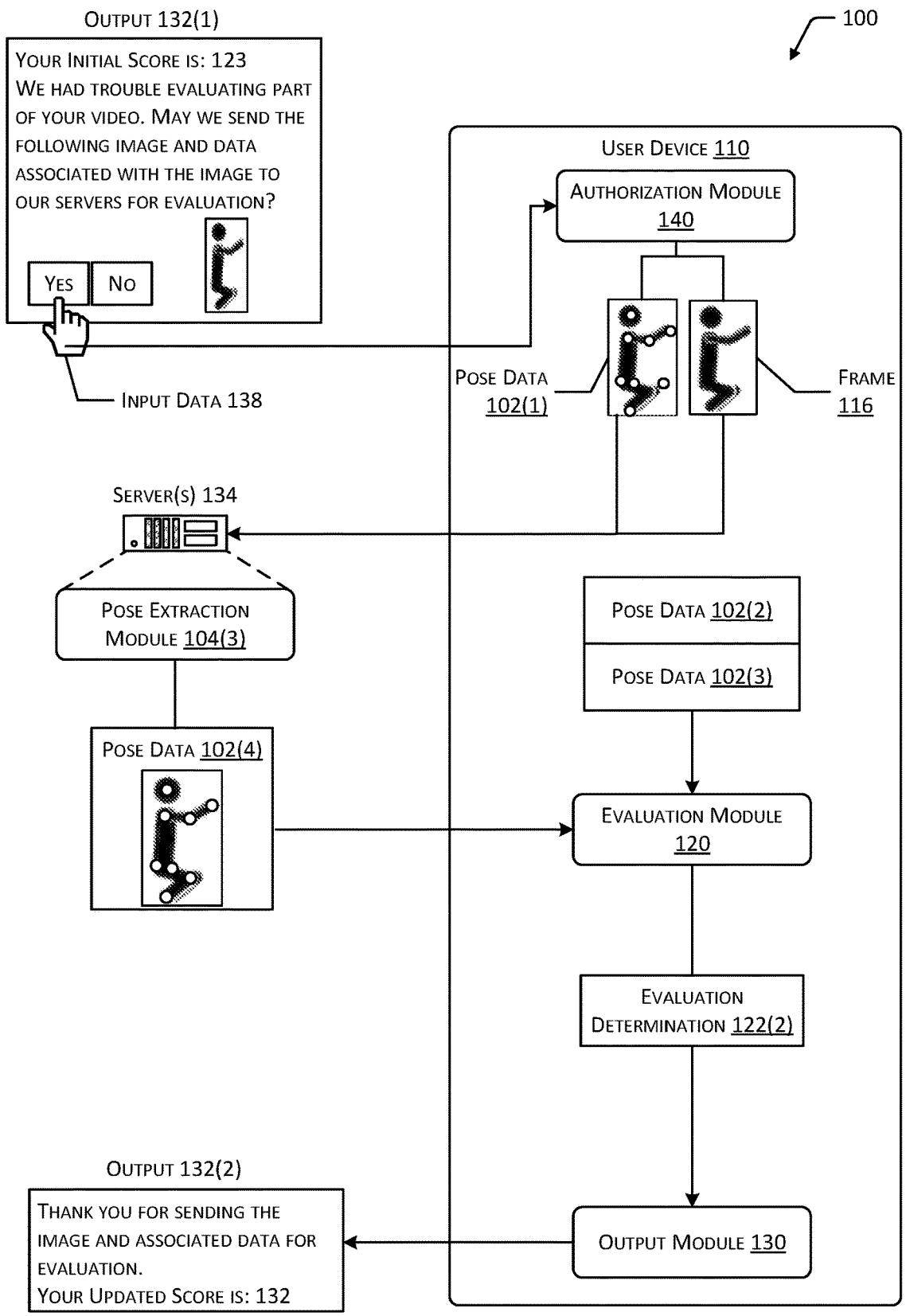
Figure 1C:
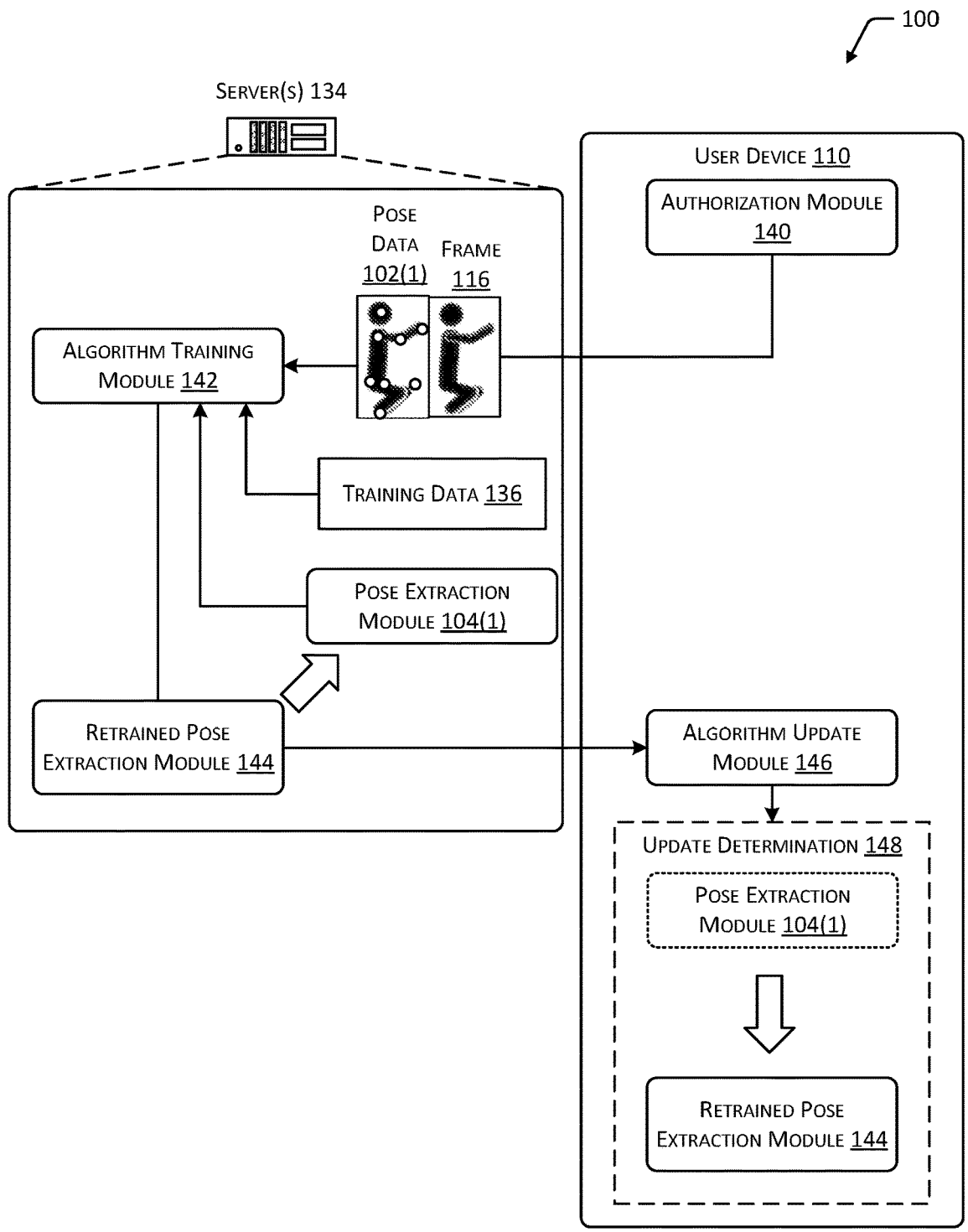

FIGS. 1A-1C depict an implementation of a system 100 for determining improved pose data 102 and pose extraction algorithms in response to potentially inaccurate pose data 102. One or more pose extraction modules 104 may use various pose extraction algorithms, machine learning systems, computer vision, and other techniques to determine pose data 102. As shown in FIG. 1A, a user 106 may perform an activity within a field of view of one or more cameras 108. For example, a camera 108 may be incorporated within a user device 110, such as a smartphone, or other types of personal, portable, or wearable computing devices. As another example, a camera 108 may be in wired or wireless communication with a user device 110. The camera(s) 108 may acquire video data 112 representing performance of the activity by the user 106. For example, the user 106 may perform a fitness exercise or other type of activity within the field of view of a camera 108, in some cases assisted by presentation of video or audio instruction using a display device, speaker, or other output device 114 associated with the user device 110, or in wired or wireless communication with the user device 110. The video data 112 may include a series of frames 116, each frame 116 representing the user 106, and other objects within the field of view of the camera 108 at a particular time, as a set of pixels.

In some implementations, one or more other types of sensors may also acquire data indicative of performance of the activity by the user 106. For example, held or wearable sensors, such as accelerometers, gyroscopes, or other types of motion or position sensors may be used to determine motion data, position data, and so forth that indicates the position or movement of portions of the user's body. Sensors that detect the movement or position of the user 106 or another object may also be integrated within objects in the environment. For example, a floor mat may include a sensor that detects a user's position on top of the mat. As another example, a sensor may be associated with an object that may be manipulated by a user 106, such as a piece of fitness equipment, and may generate data indicative of a position, orientation, or rate of movement of the user 106 or object. As yet another example, sensors associated with the user's body may generate data indicative of a user's blood pressure, cardiac pulse (e.g., heart rate), temperature, respiration rate, and so forth.

The user device 110 may store one or more pose extraction modules 104, which may each use one or more different pose extraction algorithms to determine pose data 102 based on the acquired video data 112. In some implementations, the user device 110 may store one or more other video analysis modules, which may determine other characteristics of the movement or position of the user 106 based on the video data 112, such as motion data indicative of the movement of one or more body parts of the user 106 between frames 116 of video data 112. While FIG. 1A depicts the user device 110 determining pose data 102 based on the video data 112, in other implementations, the video data 112 may be sent to one or more other computing devices, which may determine the pose data 102. However, retaining the video data 112 on the user device 110, or one or more other computing devices in an environment with the user 106 or user device 110, rather than transmitting video data 112 to other devices may preserve the privacy and security of the user 106. While FIG. 1A depicts the user device 110 determining pose data 102 using two pose extraction modules 104 that may utilize different sets of algorithms, any number of pose extraction modules 104 and associated algorithms may be used to determine any number of corresponding pose data 102, and any number of other types of modules may be used to determine motion data or other data indicative of the movement or position of the user 106 within frames 116 of video data 112.

Each pose extraction module 104 may determine respective pose data 102 based on the acquired video data 112. Different pose extraction modules 104 may use different computer vision or image analysis techniques to determine the pose data 102. For example, pose extraction modules 104 may determine pose data 102 based on the positions of edges of objects within frames 116 of the video data 112, the movement of pixels between frames 116 of video data 112, the colors of one or more pixels, and so forth. In some implementations, segmentation techniques may be used to differentiate between human forms and other objects. Additionally, in some implementations, machine learning systems such as deep CNNs, may be used to identify estimated locations of particular body parts of the user 106. For example, FIG. 1A depicts a first pose extraction module 104(1) determining first pose data 102(1) based on a frame 116 of the video data 112, and a second pose extraction module 104(2) determining second pose data 102(2) based on the same frame 116 of the video data 112. Each pose data 102 may represent a position of the body of the user 106 at a time associated with the frame 116 as a set of points 118, each point 118 representing the estimated location and orientation of a particular body part of the user 106. In some cases, because different pose extraction modules 104 utilize different techniques to determine pose data 102, one or more of the determined points 118 may differ between pose extraction modules 104. For example, FIG. 1A depicts the first pose data 102(1) including a first point 118(1) representing a right knee of the user 106 at a first estimated location, and the second pose data 102(2) including a second point 118(2) representing the right knee of the user 106 at a second estimated location that differs from the first estimated location. When the location of one or more points 118 associated with a particular pose extraction module 104 differ from the location(s) of corresponding point(s) 118 determined by one or more other pose extraction modules 104, from known or threshold values, from values determined using other algorithms such as motion data indicative of movement of the user 106, or if a confidence value associated with a determined point 118 is less than a threshold value, this may indicate a potential inaccuracy associated with the pose extraction algorithm. For example, the different locations of the first point 118(1) and second point 118(2) shown in FIG. 1A may indicate that the locations of one or both of the points 118 may be subject to inaccuracy.

An evaluation module 120 associated with the user device 110 may generate an evaluation determination 122(1) based on one or more of the first pose data 102(1) or second pose data 102(2). In some implementations, the evaluation module 120 may determine correspondence between third pose data 102(3) that represents correct or expected poses during performance of the activity, and one or more of the first pose data 102(1), the second pose data 102(2), or one or more values determined based on the first pose data 102(1) and second pose data 102(2). For example, the first pose data 102(1) and second pose data 102(2) for a particular frame 116 may be used to determine an average pose, or different points 118 from the first pose data 102(1) and second pose data 102(2) may be combined to represent a pose of the user 106. The evaluation determination 122(1) may include a score, rating, or other type of value indicative of correspondence between the third pose data 102(3) and the pose data 102 determined by the pose extraction modules 104. In some implementations, the evaluation determination 122(1) may include instructions, feedback, an indication of body parts of the user 106 that are positioned at correct or incorrect locations, and so forth.

A quality module 124 associated with the user device 110 may generate a quality determination 126 based on the first pose data 102(1), the second pose data 102(2), and in some implementations, algorithm data 128 indicative of one or more characteristics of pose data 102 that may indicate high confidence, low confidence, accurate determination of pose data 102, inaccurate determination of pose data 102, and so forth. For example, the quality determination 126 may indicate a potential inaccuracy associated with one or more of the first pose data 102(1) or second pose data 102(2) based on a distance between the location of the first point 118(1) and the location of the second point 118(2) exceeding a threshold distance indicated in the algorithm data 128. As another example, the algorithm data 128 may indicate particular characteristics of video data 112 or pose data 102 that may be associated with inaccurate determinations using a pose extraction module 104, such as particular pixel colors, quantities of light, types of movement, and so forth. Continuing the example, if characteristics of the video data 112 or pose data 102 correspond to the characteristics indicated in the algorithm data 128, the quality determination 126 may indicate a potential inaccuracy associated with a pose extraction module 104.

An output module 130 associated with the user device 110 may cause presentation of output 132(1) based on the evaluation determination 122(1) and quality determination 126. The output 132(1) may be presented using one or more output devices 114 associated with the user device 110. The output 132(1) may include a score, rating, or other value, feedback, or instruction, based on the evaluation determination 122(1). In some implementations, if the quality determination 126 indicates a potential inaccuracy associated with the pose data 102 or one or more pose extraction modules 104, the output 132(1) may include a prompt, request, user interface, or other element requesting authorization to send one or more frames 116 of video data 112, and in some cases other data associated with the frame(s) 116, that are associated with the determined potential inaccuracy, to another computing device. For example, the output 132(1) may present an indication of the frame(s) 116 in association with a prompt configured to receive user input authorizing or declining authorization to send the frame(s) 116 to a server 134 or other computing device. The server 134 or other computing device that receives the frame(s) 116, and in some cases other data associated with the quality of the determined pose data 102(1), may determine additional pose data 102(4) using one or more additional pose extraction modules 104(3), and may also use the received frame(s) 116 as training data 136 to modify one or more algorithms used by the pose extraction module 104(1) that is associated with potential inaccuracy.

As shown in FIG. 1B, in response to the output 132(1), a user 106 may provide input data 138 using one or more input devices associated with the user device 110. An authorization module 140 associated with the user device 110 may receive the input data 138 and determine whether the input data 138 indicates authorization to send the indicated frame 116 of video data 112 to the server(s) 134. If the input data 138 does not indicate authorization or if input data 138 indicating authorization is not received, the frame 116 may not be sent to the server(s) 134 or to another computing device. However, if the input data 138 indicates authorization to send the frame 116, the authorization module 140 may cause the frame 116 of video data 112, and in some implementations, pose data 102(1) that corresponds to the frame 116, to be sent to one or more servers 134 or other computing devices. While FIG. 1B depicts a server 134 receiving the frame 116 and pose data 102(1), any number and any type of computing device(s) may receive the frame 116 including, without limitation, the types of computing devices described with regard to the user device 110.

The server(s) 134 may use one or more pose extraction modules 104(3) to determine pose data 102(4) based on the received frame(s) 116 of video data 112. The pose extraction modules(s) 104(3) used by the server(s) 134 may include different pose extraction algorithms than those associated with the user device 110. For example, pose extraction algorithms associated with the user device 110 may utilize a limited set of functions to reduce the power, time, and computational resources associated with determination of pose data 102 by the user device 110, such as to enable an output 132(1) to be presented promptly after completion of an activity by a user 106. The pose extraction algorithm(s) associated with the pose extraction module(s) 104(3) of the server(s) 134 may use larger quantities of memory, processor cycles, time, power, or other computational resources, and as a result, may determine pose data 102(4) that is more accurate than the pose data 102 determined by the user device 110. The more accurate pose data 102(4) determined by the server(s) 134 may be sent to the user device 110 and used to replace or supplement potentially inaccurate pose data 102 determined using one or more of the pose extraction modules 104 associated with the user device 110. For example, FIG. 1B depicts the evaluation module 120 determining a second evaluation determination 122(2) based on the second pose data 102(2) and third pose data 102(3), and based on fourth pose data 102(4) determined by the server(s) 134 rather than the first pose data 102(1) as shown in FIG. 1A. The evaluation determination 122(2) based on the pose data 102(4) received from the server(s) 134 may more accurately represent performance of the activity by the user 106 than the previous evaluation determination 122(1) based on potentially inaccurate pose data 102.

The output module 130 may determine a second output 132(2) based on the second evaluation determination 122(2). For example, the second evaluation determination 122(2) may cause presentation of a different score, rating, value, instruction, or feedback than the initial evaluation determination 122(1). Continuing the example, FIG. 1B depicts the second output 132(2) presenting an indication that the frame 116 of video data 112 and associated data was sent to the server(s) 134 and an updated score based on the pose data 102(4) determined by the server(s) 134.

As described previously, one or more frames 116 of video data 112 sent to the server(s) 134 may also be used to determine improved pose extraction algorithms. For example, the server(s) 134 may store one or more algorithms associated with the first pose extraction module 104(1) used by the user device 110. As shown in FIG. 1C, an algorithm training module 142 associated with the server(s) 134 may be used periodically, continuously, or on demand to train or otherwise modify one or more algorithms associated with the first pose extraction module 104(1) based on training data 136. The training data 136 may include one or more frames 116 of video data 112, pose data 102, or other data representing correct or incorrect poses associated with an activity, accurate or inaccurate locations of points 118, and so forth. The training data 136 may include both test data and training data 136 used to train the algorithm(s) associated with the first pose extraction module 104(1) and determine the ability of the algorithm(s) to accurately determine pose data 102 based on video data 112.

The frame 116 of video data 112 received from the user device 110, and in some implementations, pose data 102(1) associated with the frame 116, or other data indicative of the quality or other characteristics of the pose data 102(1), video data 112, or frame 116, may be used as additional training data 136 when modifying the algorithm(s) associated with the first pose extraction module 104(1). For example, a frame 116 of video data 112 and associated pose data 102(1) that may potentially be inaccurate may be used as training data 136 indicative of a negative, incorrect, or inaccurate pose determination. Based on the received frame 116, pose data 102(1), and in some cases, other data received from the user device 110 or other computing devices, the algorithm training module 142 may determine a retrained pose extraction module 144 based on the first pose extraction module 104(1). The server(s) 134 may send the retrained pose extraction module 144 to the user device 110.

An algorithm update module 146 associated with the user device 110 may generate an update determination 148 based on the retrained pose extraction module 144. Based on the update determination 148, the user device 110 may modify or replace one or more pose extraction modules 104. For example, FIG. 1C depicts the update determination 148 causing the user device 110 to replace the first pose extraction module 104(1) with the retrained pose extraction module 144, which may improve the accuracy of pose data 102 determined by the user device 110 when subsequent video data 112 is acquired.

Figure 2:
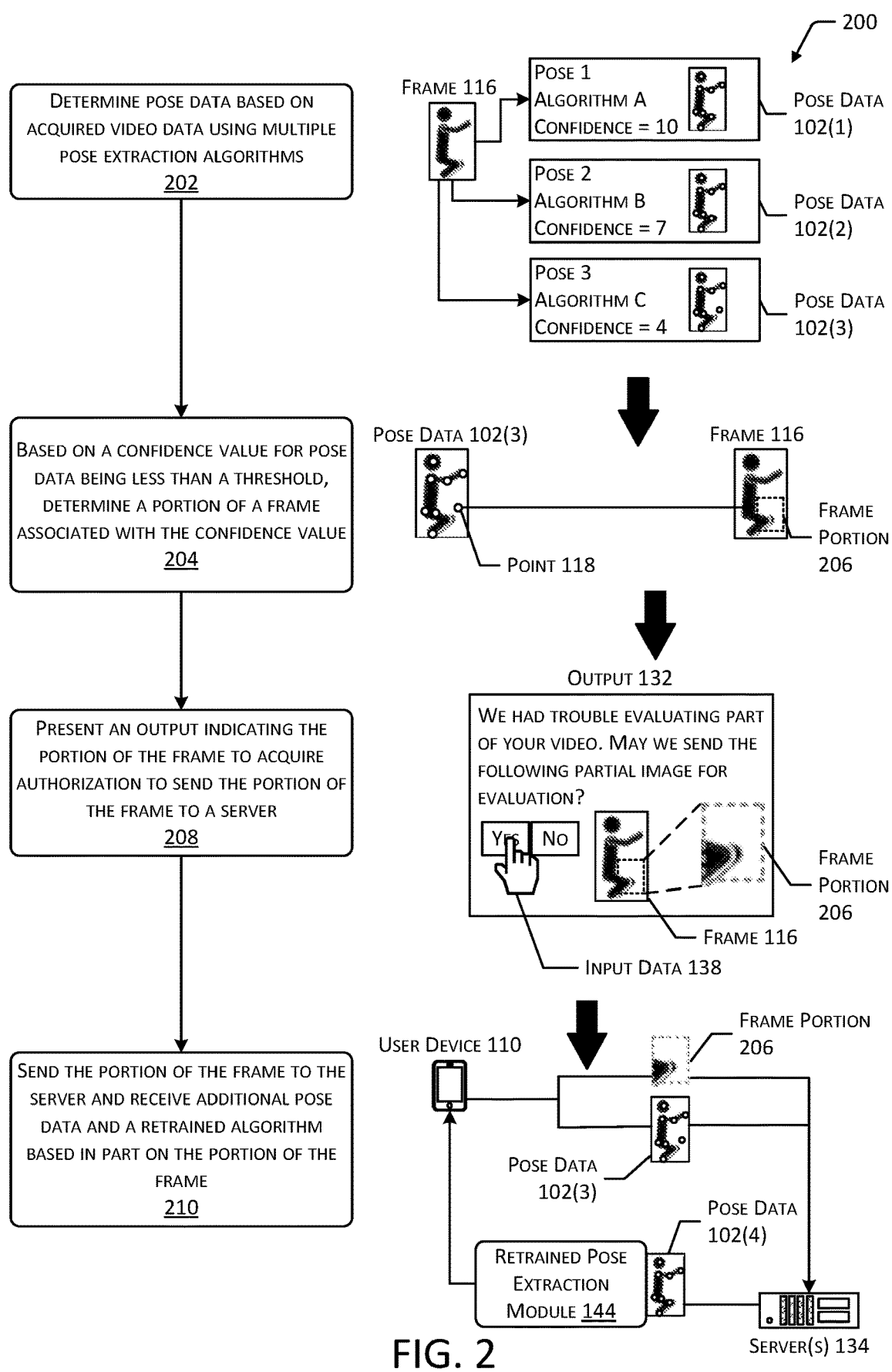
FIG. 2 is a diagram depicting an implementation of a method for determining improved pose data and pose extraction algorithms based on a portion of a frame of video data associated with potentially inaccurate pose data.

FIG. 2 is a diagram 200 depicting an implementation of a method for determining improved pose data 102 and pose extraction algorithms based on a portion of a frame 116 of video data 112 associated with potentially inaccurate pose data 102. At 202, pose data 102 may be determined based on acquired video data 112 using multiple pose extraction algorithms. For example, a user device 110 may acquire video data 112 representing a user 106 performing an activity within a field of view of a camera 108. The user device 110 may execute multiple pose extraction algorithms associated with pose extraction modules 104. For example, each pose extraction algorithm may determine pose data 102 based on a particular frame 116 or set of frames 116 of the video data 112 using different techniques, and the pose data 102 determined using each pose extraction algorithm may be used in combination to estimate the pose of the user 106 more accurately than use of a single pose extraction algorithm. Continuing the example, FIG. 2 depicts first pose data 102(1) that may be determined using a first pose extraction algorithm, second pose data 102(2) that may be determined using a second pose extraction algorithm, and third pose data 102(3) that may be determined using a third pose extraction algorithm. In some cases, the locations of one or more points 118 that represent the pose of the user 106 may differ between different pose data 102, which may indicate potential inaccuracy in one or more of the pose data 102. In some implementations, determination of pose data 102 may include determining a confidence value associated with the pose data 102, or with one or more points 118 associated with the pose data 102. The confidence value for a particular pose data 102 may be based on similarities or differences between the particular pose data 102 and other pose data 102. In other cases, the confidence value may be based on characteristics of the video data 112. For example, certain types of lighting, color, movement, the presence or absence of background objects, and so forth may be associated with high or low confidence for a particular pose extraction algorithm. In other cases, a confidence value associated with the locations of one or more points 118 may be determined using one or more other algorithms, such as motion algorithms. For example, a motion algorithm may determine movement of a particular body part of the user 106 between different frames 116 of video data 112. If pose data 102 for the associated frames 116 does not indicate the same movement of the particular body part, this may indicate that the point 118 representing the particular body part in the pose data 102 may be inaccurate.

At 204, based on a confidence value for a pose data 102 being less than a threshold, a portion of a frame 116 associated with the confidence value may be determined. For example, FIG. 2 depicts the third pose data 102(3) including a point 118 that represents the location of the right knee of the user 106. The location of the point 118 may differ from the location of corresponding points 118 in the first pose data 102(1) and second pose data 102(2) by at least a threshold distance. The user device 110 may determine the point 118 or set of points 118 associated with the confidence value for the pose data 102(3), and the frame portion 206 of the frame 116 of video data 112 that corresponds to the location of the point 118. For example, FIG. 2 depicts the determined frame portion 206 as a bounded rectangular region of the frame 116 that includes the location of the point 118 and a portion of the frame 116 surrounding the point 118.

At 208, an output 132 indicating the portion of the frame 116 may be presented to acquire authorization to send the portion of the frame 116 to a server 134. For example, the output 132 may include a user interface that presents an indication of the frame 116 or frame portion 206 and a prompt requesting authorization to send the frame 116 or frame portion 206 to one or more other computing devices. Input data 138 providing or declining authorization to send the frame 116 or frame portion 206 may be received from an input device associated with the user device 110. If authorization to send the frame 116 or frame portion 206 is not received or if authorization is declined, the frame 116 or frame portion 206 may not be sent. However, in some cases, other data that may be used to improve the pose extraction algorithm or pose data 102(3) that does not implicate the privacy of the user 106, such as motion flow data, may be determined and sent. If authorization to send the frame 116 or frame portion 206 is received, the frame portion 206, and in some implementations, pose data 102(3) determined based on the frame portion 206 may be sent to the server(s) 134. In some implementations, motion flow data or other types of data may also be determined and sent to the server(s) 134 in addition to the frame portion 206.

At 210, the potion of the frame 116 may be sent to the server 134, and additional pose data 102(4) and a retrained algorithm may be received, based in part on the portion of the frame 116 that was sent. For example, as described with regard to FIGS. 1B and 1C, the server(s) 134 may store one or more pose extraction algorithms that differ from the pose extraction algorithms associated with the user device 110, and that may utilize more time or computational resources to determine pose data 102 than the pose extraction algorithms associated with the user device 110. Based on the frame portion 206 received from the user device 110, the server(s) 134 may determine pose data 102(4) using one or more other pose extraction algorithms, and the pose data 102(4) may be provided to the user device 110 for use determining an output 132. The server(s) 134 may also use the frame portion 206, pose data 102(3), and in some cases, other data received from the user device 110 as training data 136 to modify one or more pose extraction algorithms associated with the user device 110 or determine a replacement pose extraction algorithm. The server(s) 134 may send a retrained pose extraction module 144 that includes one or more new, modified, or replacement algorithms to the user device 110 for future use. In some implementations, the retrained pose extraction module 144 may be used in place of one or more of the pose extraction modules 104 associated with the low confidence value.

Figure 3:
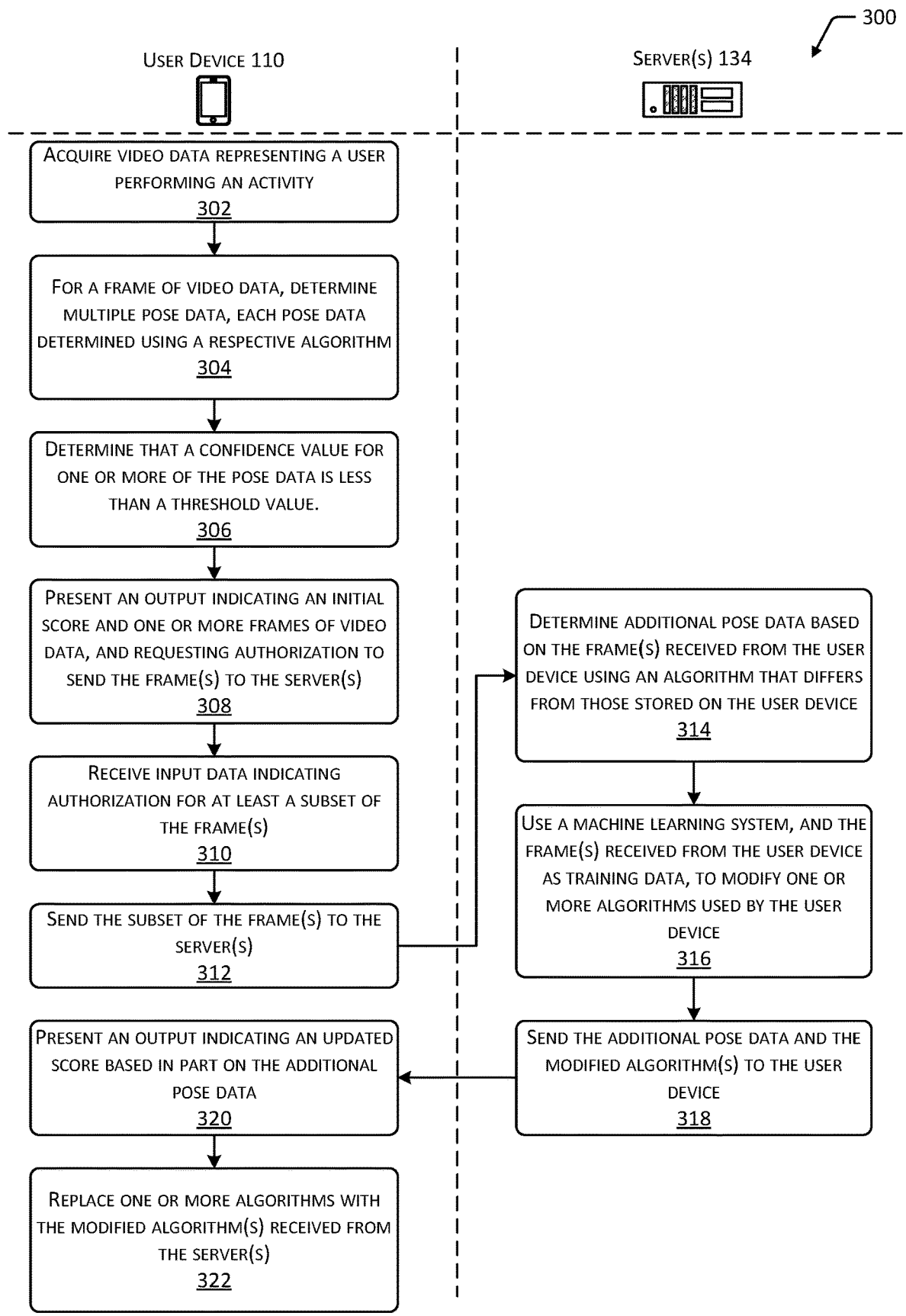
FIG. 3 is a flow diagram depicting an implementation of a method for determining pose data and pose extraction algorithms based on interactions between a user device and one or more servers.

FIG. 3 is a flow diagram 300 depicting an implementation of a method for determining pose data 102 and pose extraction algorithms based on interactions between a user device 110 and one or more servers 134. At 302, the user device 110 may acquire video data 112 representing a user 106 performing an activity. For example, the user device 110 may include or be in communication with one or more cameras 108, and the user 106 may perform the activity within the field of view of the camera(s) 108.

At 304, the user device 110 may determine multiple pose data 102 for each frame of video data 112. Each pose data 102 may be determined using a respective algorithm. For example, the user device 110 may store or access multiple pose extraction modules 104, each of which may use different algorithms and techniques to determine pose data 102 based on a frame 116 or set of frames 116 of video data 112. Determination of multiple pose data 102 using multiple pose extraction algorithms may improve the accuracy of determined poses when compared to use of a single pose extraction algorithm. For example, different pose extraction algorithms may be subject to inaccuracy under certain conditions or based on certain characteristics of the video data 112, and different pose extraction algorithms may exhibit greater accuracy under certain conditions or based on certain characteristics of the video data 112. In some implementations, the user device 110 may determine additional data that may be used to determine and improve the accuracy of the pose data 102, such as movement data indicative of the motion of the user 106 between frames 116 of video data 112. For example, if the movement data indicates motion of the user that is not also included in pose data 102 for adjacent frames 116, this may indicate a potential inaccuracy in the pose data 102.

At 306, the user device 110 may determine that a confidence value for one or more of the pose data 102 is less than a threshold value. In some implementations, the confidence value for a pose data 102 may be determined by comparing the locations of one or more points 118 of the pose data 102 with the locations of corresponding points 118 associated with other pose data 102, or with locations determined based on multiple pose data 102. For example, if the location of a point 118 associated with particular pose data 102 differs from a location of a corresponding point 118 associated with other pose data 102 by at least a threshold distance, this may indicate a low confidence value for the particular pose data 102. In other implementations, the confidence value for a pose data 102 may be determined by comparing the locations of one or more points 118 of the pose data 102 with corresponding known locations of points 118, such as annotated or "ground-truth" data. In still other implementations, the confidence value for a pose data 102 may be determined based on characteristics of the video data 112. For example, a particular pose extraction algorithm may exhibit accuracy or inaccuracy if the video data 112 is associated with certain colors, types of movement, certain lighting conditions, and so forth. In other implementations, the confidence value for a pose data 102 may be determined based on characteristics of the pose data 102 itself. For example, various rules may constrain the locations and orientations of one or more points 118 of a pose relative to one or more other points 118. Continuing the example, the location of a point 118 representing the elbow of a user 106 may be constrained relative to the location of a point 118 representing the shoulder of the user 106, which may be constrained relative to the location of a point representing the head of the user 106, and so forth. If the locations of the points 118 associated with pose data 102 deviate from the rules that constrain the locations of the points 118, this may result in a low confidence value for the pose data 102. As another example, if statistical values associated with a point 118 for pose data 102 based on a particular frame 116 of video data 112 differ by more than a threshold from statistical values for the same point 118 in one or more adjacent frames 116, this may indicate that the location of the point 118 for the particular frame 116 is potentially inaccurate.

At 308, the user device 110 may present an output 132 indicating an initial score and one or more frames 116 of video data 112. The output 132 may request authorization to send the frame(s) 116, and in some cases additional data determined based on the frames 116 or that indicates one or more characteristics of the frames 116, to one or more servers 134. For example, the user device 110 may determine a score, rating, or other type of value, instruction, feedback, explanation, and so forth based on correspondence between the determined pose data 102 and existing pose data 102 that represents expected or correct poses associated with correct performance of an activity. In cases where one or more pose data 102 may be subject to potential inaccuracy, the initial score indicated in the output 132 may be affected by the potential inaccuracy. However, an output 132 that presents an initial score or other instructions or feedback may include information that is of use to the user 106. In response to one or more of the pose data 102 being associated with a confidence value that is less than a threshold value, the output 132 may also include a prompt or other type of request for authorization to send one or more frames 116 of video data 112 and other associated data to the server(s) 134. For example, the output 132 may present an indication of one or more frames 116 or portions of frames 116, such as thumbnail images, a gallery view that indicates multiple images, and so forth.

At 310, the user device 110 may receive input data 138 indicating authorization for at least a subset of the frame(s) 116. For example, a user 106 may provide input to an input device of the user device 110 to select one or more images presented in the output 132, each selected image representing a frame 116 or portion of a frame 116 of video data 112. In other implementations, a user 106 may provide input to select all presented frames 116, to decline authorization to send any of the presented frames 116, to select particular frames 116 for which authorization is declined, and so forth.

At 312, the user device 110 may send the subset of the frame(s) 116 for which authorization was received to the server(s) 14. For example, the user device 110 may communicate with the server(s) 134 using one or more networks, such as the Internet, wireless networks, cellular networks, and so forth. In other implementations, the user device 110 may communicate with one or more other computing devices, which may in turn communicate with the server(s) 134, and the user device 110 may send the frame(s) 116 to the server(s) 134 via the other computing device(s). In some implementations, the user device 110 may also send pose data 102 that corresponds to the frame(s) 116 to the server(s) 134. Additionally, in some implementations, the user device 110 may send other data indicative of the pose of the user 106, such as motion flow data that represents movement of pixels within frames 116 of video data 112.

At 314, the server(s) 134 may determine additional pose data 102 based on the frame(s) 116 received from the user device 110 using an algorithm that differs from those stored on the user device 110. For example, the pose extraction algorithm(s) stored in association with the user device 110 may utilize a limited set of techniques to limit the time, battery power, computational resources, and so forth that are used to determine the pose data 102. The pose extraction algorithm(s) associated with the server(s) 134 may use a larger quantity of computational resources and in some cases may determine pose data 102 with greater accuracy than the pose extraction algorithm(s) associated with the user device 110.

At 316, the server(s) 134 may use a machine learning system, and the frame(s) 116 received from the user device 110 as training data 136, to modify one or more algorithms used by the user device 110. For example, the server(s) 134 may store copies of at least a subset of the pose extraction algorithms used by the user device 110. A machine learning system, such as an algorithm training module 142 described with regard to FIG. 1C, may use the received frame(s) 116, as well as other pre-existing data received from the user device 110, other user devices 110, or annotated data, as training data 136 and test data to modify one or more pose extraction algorithms, determine new pose extraction algorithms, and so forth. For example, the server(s) 134 may determine one or more algorithms for use with a retrained pose extraction module 144 based at least in part on the frame(s) 116 received from the user device 110. In some implementations, the server(s) 134 may determine one or more additional pose extraction algorithms to provide to the user device 110 based in part on one or more characteristics of the received frame(s) 116. For example, if a frame 116 is associated with a particular lighting condition, particular colors, particular types of movement, a particular background, and so forth, one or more pose extraction algorithms specifically suited for determining pose data 102 based on frames 116 having particular characteristics may be determined and sent to the user device 110.

At 318, the server(s) 134 may send the additional pose data 102 and the modified or additional algorithm(s) to the user device 110. Data from the server(s) 134 may be sent to the user device 110 using the same or different communication channels as those used by the user device 110 to send data to the server(s) 134.

At 320, the user device 110 may present an output 132 indicating an updated score based in part on the additional pose data 102. For example, the user device 110 may determine an output 132 based on the additional pose data 102 received from the server(s) 134 and other pose data 102 determined using pose extraction algorithms associated with the user device 110. In some implementations, the user device 110 may replace pose data 102 associated with a confidence score less than a threshold with pose data 102 received from the server(s) 134 when determining the output 132. In still other implementations, the output 132 may be determined based on the pose data 102 received from the server(s) 134, and other pose data 102 determined by the user device 110 may be disregarded.

At 322, the user device 110 may replace one or more algorithms with the modified algorithm(s) received from the server(s) 134. For example, a retrained pose extraction algorithm received from the server(s) 134 may be a version of a pose extraction algorithm stored on the user device 110 that has been trained using additional training data 136 to improve the accuracy of the algorithm. In such a case, the retrained pose extraction algorithm may replace the previous version of the algorithm. In other implementations, the retrained pose extraction algorithm, or one or more additional pose extraction algorithms received from the server(s) 134, may be used by the user device 110 in addition to each of the other pose extraction algorithms stored on the user device 110. In still other implementations, the retrained pose extraction algorithm may be used in place of multiple existing pose extraction algorithms stored on the user device 110.

Figure 4:
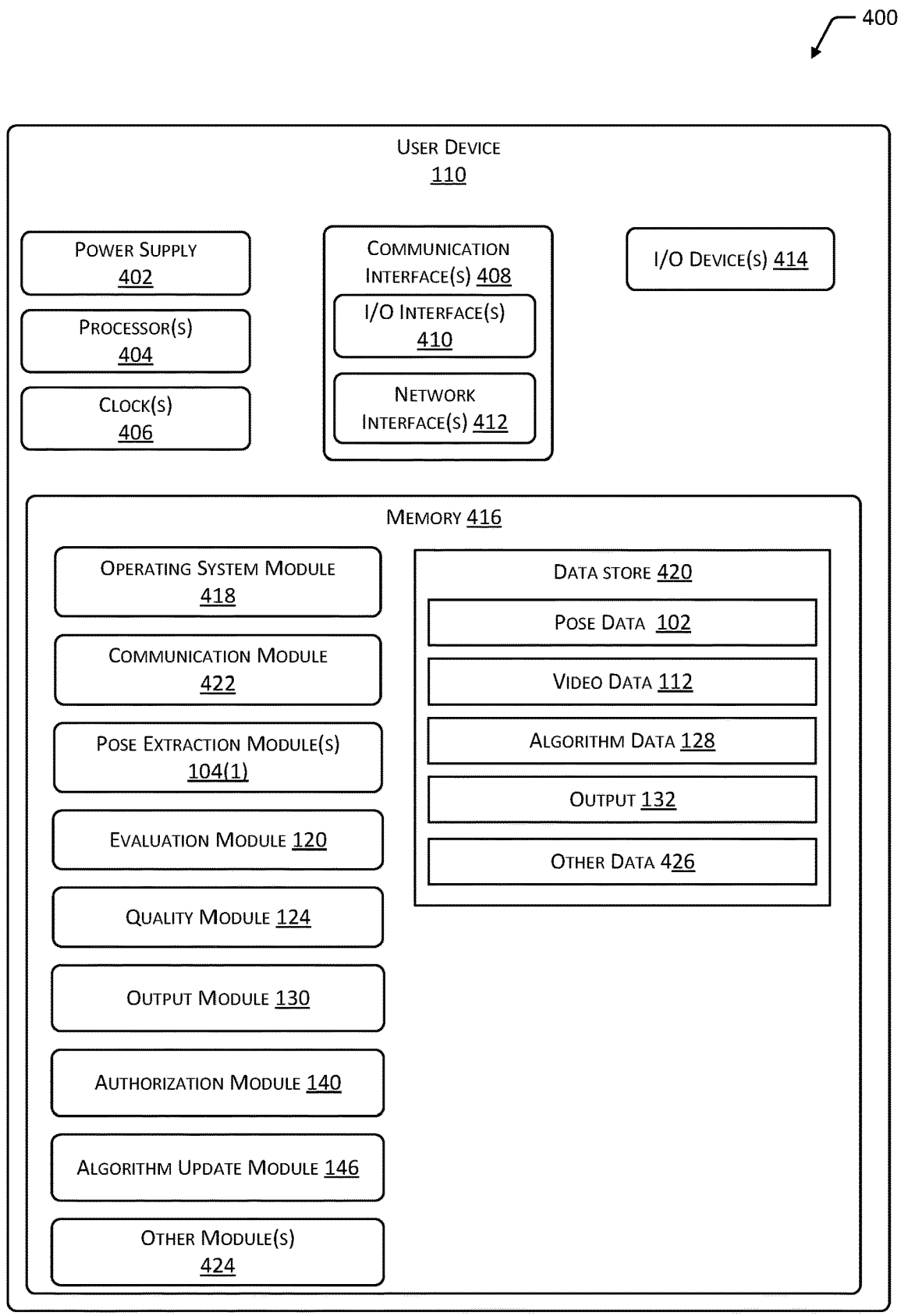
FIG. 4 is a block diagram illustrating an implementation of a user device within the present disclosure.

FIG. 4 is a block diagram 400 illustrating an implementation of a user device 110 within the present disclosure. The user device 110 may include a personal computing device, portable computing device, wearable computing device, or any other type of computing device having an integrated camera 108, such as a smartphone, or any type of computing device that may communicate with a camera 108 to receive acquired video data 112. While FIG. 4 depicts a single block diagram 400 of a user device 110, in some implementations, multiple computing devices may be used to perform the functions described herein.

One or more power supplies 402 may be configured to provide electrical power suitable for operating the components of the user device 110. In some implementations, the power supply 402 may include a rechargeable battery, fuel cell, photovoltaic cell, power conditioning circuitry, and so forth.

The user device 110 may include one or more hardware processor(s) 404 (processors) configured to execute one or more stored instructions. The processor(s) 404 may include one or more cores. One or more clock(s) 406 may provide information indicative of date, time, ticks, and so forth. For example, the processor(s) 404 may use data from the clock 406 to generate a timestamp, trigger a preprogrammed action, and so forth.

The user device 110 may include one or more communication interfaces 408, such as input/output (I/O) interfaces 410, network interfaces 412, and so forth. The communication interfaces 408 may enable the user device 110, or components of the user device 110, to communicate with other computing devices or components of the other computing devices. The I/O interfaces 410 may include interfaces such as Inter-Integrated Circuit (I2C), Serial Peripheral Interface bus (SPI), Universal Serial Bus (USB) as promulgated by the USB Implementers Forum, RS-232, and so forth.

The I/O interface(s) 410 may couple to one or more I/O devices 414. The I/O devices 414 may include any manner of input devices or output devices 114 associated with the user device 110. For example, I/O devices 414 may include touch sensors, displays, touch sensors integrated with displays (e.g., touchscreen displays), keyboards, mouse devices, microphones, image sensors, cameras 108, scanners, speakers or other types of audio output devices, haptic devices, printers, and so forth. In some implementations, the I/O devices 414 may be physically incorporated with the user device 110. In other implementations, I/O devices 414 may be externally placed.

The network interfaces 412 may be configured to provide communications between the user device 110 and other devices, such as the I/O devices 414, routers, access points, and so forth. The network interfaces 412 may include devices configured to couple to one or more networks including local area networks (LANs), wireless LANs (WLANs), wide area networks (WANs), wireless WANs, and so forth. For example, the network interfaces 412 may include devices compatible with Ethernet, Wi-Fi, Bluetooth, ZigBee, Z-Wave, 3G, 4G, 5G, LTE, and so forth.

The user device 110 may include one or more buses or other internal communications hardware or software that allows for the transfer of data between the various modules and components of the user device 110.

As shown in FIG. 4, the user device 110 may include one or more memories 416. The memory 416 may include one or more computer-readable storage media (CRSM). The CRSM may be any one or more of an electronic storage medium, a magnetic storage medium, an optical storage medium, a quantum storage medium, a mechanical computer storage medium, and so forth. The memory 416 may provide storage of computer-readable instructions, data structures, program modules, and other data for the operation of the user device 110. A few example modules are shown stored in the memory 416, although the same functionality may alternatively be implemented in hardware, firmware, or as a system on a chip (SoC).

The memory 416 may include one or more operating system (OS) modules 418. The OS module 418 may be configured to manage hardware resource devices such as the I/O interfaces 410, the network interfaces 412, the I/O devices 414, and to provide various services to applications or modules executing on the processors 404. The OS module 418 may implement a variant of the FreeBSD operating system as promulgated by the FreeBSD Project; UNIX or a UNIX-like operating system; a variation of the Linux operating system as promulgated by Linus Torvalds; the Windows operating system from Microsoft Corporation of Redmond, Washington, USA; or other operating systems.

One or more data stores 420 and one or more of the following modules may also be associated with the memory 416. The modules may be executed as foreground applications, background tasks, daemons, and so forth. The data store(s) 420 may use a flat file, database, linked list, tree, executable code, script, or other data structure to store information. In some implementations, the data store(s) 420 or a portion of the data store(s) 420 may be distributed across one or more other devices including other computing devices, network attached storage devices, and so forth.

A communication module 422 may be configured to establish communications with one or more other computing devices, such as servers 134. Communications may be authenticated, encrypted, and so forth.

The memory 416 may also store one or more pose extraction modules 104(1). A pose extraction module 104(1) may use various algorithms or other techniques to determine pose data 102 based on video data 112. Different pose extraction modules 104(1) may use different techniques to determine the pose data 102. For example, pose extraction modules 104(1) may determine pose data 102 based on the positions of edges of objects within frames 116 of the video data 112, the movement of pixels between frames 116, and so forth. In some implementations, the pose extraction module(s) 104(1) may include or may use machine learning algorithms or systems to identify estimated locations of objects within a frame 116, such as the locations of particular body parts of a user 106. The pose extraction module(s) 104(1) associated with the user device 110 may use a limited set of algorithms or techniques to reduce the amount of time and computational resources used to determine the pose data 102. For example, the user device 110 may include a computing device having limited memory, processing capabilities, battery power, and so forth. Additionally, presentation of an output 132 promptly after completion of an activity by a user 106 may result in a more favorable user experience than the latency associated with use of algorithms that are more computationally intensive.

The memory 416 may also store the evaluation module 120. The evaluation module 120 may generate an evaluation determination 122 based on characteristics of determined pose data 102. In some implementations, the evaluation module 120 may determine correspondence between pose data 102 that is determined based on acquired video data 112 and pose data 102 that represents correct or expected poses during performance of the activity, such as annotated pose data 102. In some implementations, the evaluation module 120 may determine a value, average pose, or aggregate pose based on multiple pose data 102 determined using multiple pose extraction modules 104. The evaluation determination 122 may include a score, rating, or other type of value, instruction, feedback, or information indicative of the determined pose data 102.

The memory 416 may additionally store the quality module 124. The quality module 124 may generate a quality determination 126 based on characteristics of determined pose data 120 and in some implementations, algorithm data 128 indicative of one or more characteristics that may indicate high confidence, low confidence, accurate determination of pose data 102, inaccurate determination of pose data 102, and so forth. For example, the quality determination 126 may indicate a potential inaccuracy associated with pose data 102 that differs from other acquired pose data 102 by at least a threshold. As another example, the algorithm data 128 may indicate particular characteristics of video data 112 or pose data 102 that may be associated with inaccurate determinations when using a particular pose extraction module 104 or algorithm, such as particular colors, levels of light, types or rates of movement, and so forth. Continuing the example, if characteristics of the video data 112 or pose data 102 correspond to the characteristics indicated in the algorithm data 128, a quality determination 126 may indicate a potential inaccuracy associated with a pose extraction module 104.

The memory 416 may store the output module 130. The output module 130 may cause presentation of output 132 based on an evaluation determination 122, and in some cases, based on a quality determination 126. For example, an output 132 may include a score, rating, or other value, feedback, instruction, or information based on an evaluation determination 122. If a quality determination 126 indicates a potential inaccuracy associated with the pose data 102 or one or more pose extraction modules 104, an output 132 may include a prompt, request, user interface, or other element requesting authorization to send one or more frames 116 of video data 112 associated with the determined potential inaccuracy to another computing device.

The memory 416 may also store the authorization module 140. The authorization module 140 may determine authorization to send frames 116 or portions of frames 116 to a server 134 or other computing device, or a lack of such authorization, based on user input provided in response to an output 132, or a lack of user input. If received input data 138 does not indicate authorization or if input data 138 indicating authorization is not received, video data 112 may not be sent to other computing devices to protect the privacy of the user 106. However, if input data 138 indicating authorization to send one or more frames 116 is received, the authorization module 140 may cause the frame(s) 116 of video data 112, and in some implementations, pose data 102 that corresponds to the frame(s) 116, to be sent to one or more servers 134 or other computing devices.

The memory 416 may additionally store the algorithm update module 146. The algorithm update module 146 may generate an update determination 148 based on a retrained pose extraction module 144 received from a server 134 or other computing device. For example, the algorithm update module 146 may modify or replace one or more pose extraction modules 104 when a retrained pose extraction module 144 is received.

Other modules 424 may also be present in the memory 416. For example, other modules 424 may include permission or authorization modules to enable a user 106 to provide authorization to acquire video data 112 of the user 106. For users 106 that do not opt-in or otherwise authorize acquisition of video data 112 that depicts the user 106, generation, transmission, or use of such video data 112 may be prevented. Other modules 424 may also include encryption modules to encrypt and decrypt communications between computing devices, authentication modules to authenticate communications sent or received by computing devices, a permission module to assign, determine, and manage user permissions to access or modify data associated with computing devices, user interface modules to generate interfaces for receiving input from users 106, such as selection of frames 116 of video data 112 that are authorized to be sent to other devices, or that are not to be sent to other devices, and so forth. Other modules 424 may additionally include modules for acquisition of video data 112, processing or modifying of video data 112 for transmission or analysis, and so forth. In some cases, other modules 424 may include algorithms for determining motion or other characteristics associated with the video data 112. For example, algorithms that determine movement data between frames 116 of video data 112 may be used to determine potentially inaccurate pose data 102 if the pose data 102 for adjacent frames 116 does not indicate movement of the same body parts of a user 106.

Other data 426 within the data store(s) 420 may include configurations, settings, preferences, and default values associated with computing devices. Other data 426 may also include encryption keys and schema, access credentials, and so forth.

Figure 5:
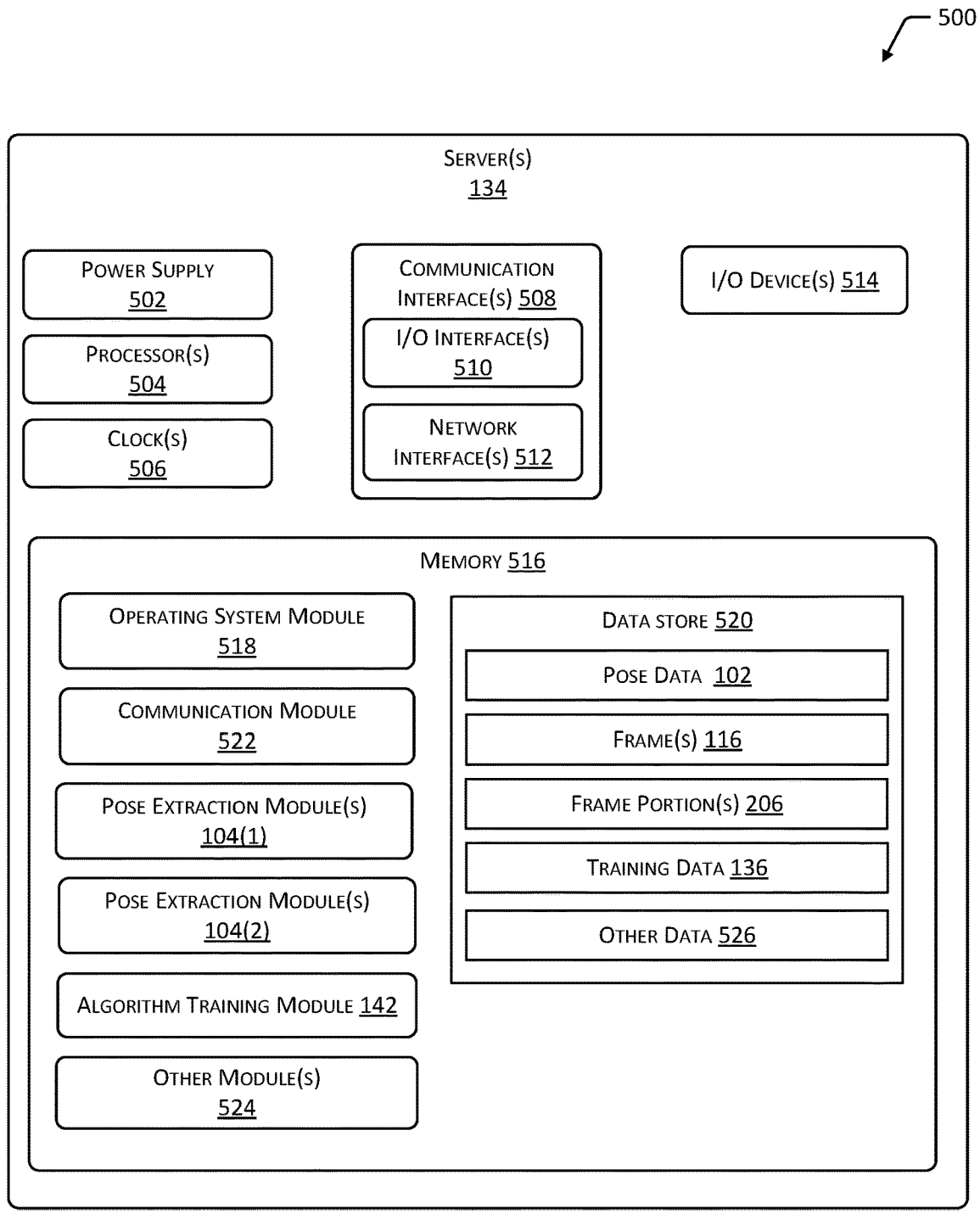
FIG. 5 is a block diagram illustrating an implementation of a server within the present disclosure.

FIG. 5 is a block diagram 500 illustrating an implementation of a server 134 within the present disclosure. The server 134 may include any type of computing device, including one or more servers, as well as any of the types of computing devices described with regard to the user device 110. Additionally, while FIG. 5 depicts a single block diagram 500 of a server 134, any number and any type of computing devices may be used to perform the functions described herein.

The server(s) 134 may include one or more power supplies 502, processors 504, clocks 506, communication interfaces 508, I/O interfaces 510, network interfaces 512, and I/O devices 514, which may include the same types of components described with regard to the user device 110, or other types of components capable of performing the same or similar functions.

The server(s) 134 may also include one or more memories 516, operating system modules 518, and data stores 520, which may include the same types of components described with regard to the user device 110, or other types of components capable of performing the same or similar functions.

The server(s) 134 may include a communication module 522, which may be configured to establish communications with one or more other computing devices, such as user devices 110. Communications may be authenticated, encrypted, and so forth.

The memory 516 may also store one or more pose extraction modules 104(2), which may determine pose data 102 based on frames 116 of video data 112 received from other computing devices, or portions of frames 116 received from other computing devices using different algorithms than those used by the user device 110. For example, pose extraction modules 104(1) associated with a user device 110 may utilize a limited set of functions to reduce the power, time, and computational resources associated with determination of pose data 102 by the user device 110, such as to enable an output 132 to be presented promptly without constraining the resources of the user device 110. Pose extraction module(s) 104(2) associated with the server(s) 134 may use larger quantities of memory, processor cycles, time, power, or other computational resources, and as a result, may determine pose data 102 that may be more accurate than the pose data 102 determined by a user device 110. The server(s) 134 may also store one or more pose extraction modules 104(1) used by the user device 110, which may be used to determine pose data 102, and may also be used for training and modifying the pose extraction modules 104(1) using data received from user devices 110.

The memory 516 may additionally store the algorithm training module 142. The algorithm training module 142 may train or otherwise modify one or more pose extraction modules 104(1) based on training data 136, which may include frames 116 or frame portions 206 received from other computing devices. The training data 136 may include both test data and training data 136 used to train pose extraction modules 104(1) and determine the ability of the pose extraction module(s) 104(1) to accurately determine pose data 102.

Other modules 524 may also be present in the memory 516. For example, other modules 524 may include permission or authorization modules that determine or obtain authorization prior to use of video data 112, encryption modules to encrypt and decrypt communications, authentication modules to authenticate communications sent or received by computing devices, a permission module to assign, determine, and manage user permissions to access or modify data associated with computing devices, and so forth.

Other data 526 within the data store(s) 520 may include configurations, settings, preferences, and default values associated with computing devices. Other data 526 may also include encryption keys and schema, access credentials, and so forth. Other data 526 may additionally include motion data, data indicative of quality or other characteristics of frames 116 of video data 112, and so forth, which may be used to test or train pose extraction algorithms and determine potential inaccuracy of pose data 102.

In different implementations, different computing devices may have different capabilities or capacities. For example, servers 134 may have greater processing capabilities or data storage capacity than smartphones or other user devices 110.

The processes discussed in this disclosure may be implemented in hardware, software, or a combination thereof. In the context of software, the described operations represent computer-executable instructions stored on one or more computer-readable storage media that, when executed by one or more hardware processors, perform the recited operations. Generally, computer-executable instructions include routines, programs, objects, components, data structures, and the like that perform particular functions or implement particular abstract data types. Those having ordinary skill in the art will readily recognize that certain steps or operations illustrated in the figures above may be eliminated, combined, or performed in an alternate order. Any steps or operations may be performed serially or in parallel. Furthermore, the order in which the operations are described is not intended to be construed as a limitation.

Embodiments may be provided as a software program or computer program product including a non-transitory computer-readable storage medium having stored thereon instructions (in compressed or uncompressed form) that may be used to program a computer (or other electronic device) to perform processes or methods described in this disclosure. The computer-readable storage medium may be one or more of an electronic storage medium, a magnetic storage medium, an optical storage medium, a quantum storage medium, and so forth. For example, the computer-readable storage media may include, but is not limited to, hard drives, optical disks, read-only memories (ROMs), random access memories (RAMS), erasable programmable ROMs (EPROMs), electrically erasable programmable ROMs (EEPROMs), flash memory, magnetic or optical cards, solid-state memory devices, or other types of physical media suitable for storing electronic instructions. Further, embodiments may also be provided as a computer program product including a transitory machine-readable signal (in compressed or uncompressed form). Examples of transitory machine-readable signals, whether modulated using a carrier or unmodulated, include, but are not limited to, signals that a computer system or machine hosting or running a computer program can be configured to access, including signals transferred by one or more networks. For example, the transitory machine-readable signal may comprise transmission of software by the Internet.

Separate instances of these programs can be executed on or distributed across any number of separate computer systems. Although certain steps have been described as being performed by certain devices, software programs, processes, or entities, this need not be the case, and a variety of alternative implementations will be understood by those having ordinary skill in the art.

Additionally, those having ordinary skill in the art will readily recognize that the techniques described above can be utilized in a variety of devices, environments, and situations. Although the subject matter has been described in language specific to structural features or methodological acts, it is to be understood that the subject matter defined in the appended claims is not necessarily limited to the specific features or acts described. Rather, the specific features and acts are disclosed as exemplary forms of implementing the claims.

What is claimed is:

1. A system comprising:
a first computing device comprising:
  one or more first memories storing first computer-executable instructions; and
  one or more first hardware processors to execute the first computer-executable instructions to:
    acquire video data representing a user performing an activity;
    use a first pose extraction algorithm to determine first pose data representing a first pose of the user within a frame of the video data, wherein the first pose data includes a first plurality of points, and each point of the first plurality of points represents a location of a respective body part of the user;
    use a second pose extraction algorithm to determine second pose data representing a second pose of the user within the frame of the video data, wherein the second pose data includes a second plurality of points, and each point of the second plurality of points represents a location of a respective body part of the user;
    determine that a first location of a first point of the first plurality of points differs from a second location of a second point of the second plurality of points by at least a threshold distance;
    in response to the first location differing from the second location by at least the threshold distance, present a first output that indicates the frame of the video data and requests authorization to send the frame to a second computing device;
    receive input data indicating the authorization to provide the frame to the second computing device;
    in response to the input data, send the frame to the second computing device;
    receive, from the second computing device, third pose data representing a third pose of the user within the frame of the video data, wherein the third pose data includes a third plurality of points, and each point of the third plurality of points represents a location of a respective body part of the user; and
    present a second output based on the third pose data.

2. The system of claim 1, wherein the second computing device comprises:
one or more second memories storing second computer-executable instructions; and
one or more second hardware processors to execute the second computer-executable instructions to:
  receive the frame of the video data from the first computing device;
  use a third pose extraction algorithm to determine the third pose data based on the frame of the video data, wherein the third pose extraction algorithm differs from the first pose extraction algorithm and the second pose extraction algorithm; and
  send the third pose data to the first computing device.

3. The system of claim 1, wherein the second computing device comprises:
one or more second memories storing second computer-executable instructions; and
one or more second hardware processors to execute the second computer-executable instructions to:
  receive the frame of the video data from the first computing device;

use a machine learning system and the frame of the video data as training data to modify the first pose extraction algorithm to form a third pose extraction algorithm; and send the third pose extraction algorithm to the first computing device.

4. A method comprising:

acquiring, using a first computing device, video data representing a user in one or more poses;

determining first pose data using a first algorithm and based on a frame of the video data, wherein the first pose data indicates a first pose of the user;

determining that a confidence value associated with the first pose data is less than a threshold value;

in response to the confidence value being less than the threshold value, acquiring authorization to send to a second computing device one or more of: at least a portion of the frame or data determined based on the at least a portion of the frame;

sending to the second computing device the one or more of the at least a portion of the frame or the data determined based on the at least a portion of the frame; and receiving, from the second computing device, second pose data indicating a second pose of the user based on the frame of the video data.

5. The method of claim 4, further comprising:

determining one or more first characteristics of the frame using one or more second algorithms;

wherein determining that the confidence value is less than the threshold value comprises determining that one or more second characteristics associated with the first pose data differ from the one or more first characteristics.

6. The method of claim 4, further comprising:

determining that one or more characteristics of the frame of the video data correspond to at least one characteristic associated with inaccurate determination of poses using the first algorithm;

wherein the confidence value is determined based at least in part on correspondence between the at least one characteristic associated with inaccurate determination of poses using the first algorithm and the one or more characteristics of the frame of the video data.

7. The method of claim 4, further comprising:

determining, using the second computing device, the second pose data based on the frame of the video data and a second algorithm that differs from the first algorithm; and sending, using the second computing device, the second pose data to the first computing device.

8. The method of claim 7, wherein the first algorithm is associated with use of a first quantity of computational resources, the second algorithm is associated with use of a second quantity of computational resources, and the second quantity is greater than the first quantity.

9. The method of claim 4, further comprising:

determining one or more characteristics of the frame of the video data;

one or more of:

determining a second algorithm associated with the one or more characteristics of the frame, or using a machine learning system associated with the second computing device to, based on the frame of video data, modify the first algorithm to form a third algorithm; and using the second computing device to send one or more of the second algorithm or the third algorithm to the first computing device.

10. The method of claim 4, further comprising:

determining a portion of the first pose that is associated with the confidence value;

determining a portion of the frame of the video data that corresponds to the portion of the first pose; and presenting an output indicating the portion of the frame and requesting the authorization to send the portion of the frame to the second computing device;

wherein the sending to the second computing device the one or more of the at least a portion of the frame or the data determined based on the at least a portion of the frame comprises sending the portion of the frame to the second computing device.

11. The method of claim 4, further comprising:

in response to the confidence value being less than the threshold value, determining one or more of:

motion flow data that represents movement of a plurality of pixels associated with the frame of the video data;

lighting data that represents a quantity of light associated with the plurality of pixels; or sensor data determined using one or more sensors associated with the user; and sending to the second computing device the one or more of the motion flow data, the lighting data, or the sensor data.

12. The method of claim 4, further comprising:

before receiving the second pose data, determining correspondence between the first pose and a third pose representing correct performance of an activity;

determining a first score based on the correspondence between the first pose and the third pose;

presenting a first output that indicates the first score, wherein one or more of the first output or a second output include a request for the authorization to send the at least a portion of the frame to the second computing device;

after receiving the second pose data, determining correspondence between the second pose and the third pose;

determining a second score based on the correspondence between the second pose and the third pose; and presenting a third output that indicates the second score.

13. A system comprising:

a first computing device comprising:

one or more first memories storing first computer-executable instructions; and one or more first hardware processors to execute the first computer-executable instructions to:

determine, based on a first frame of video data and a first algorithm, first pose data indicating a first pose of a user;

acquire authorization to send one or more of at least a portion of the first frame or data determined based on the at least a portion of the first frame to a second computing device;

send to the second computing device the one or more of the at least a portion of the first frame or the data determined based on the at least a portion of the first frame;

receive, from the second computing device, second pose data indicating a second pose of the user; and determine a first output based at least in part on the second pose data.

14. The system of claim 13, further comprising first computer-executable instructions to:
   determine that a confidence value associated with the first pose is less than a threshold value, wherein the authorization is acquired in response to the confidence value being less than the threshold value.

15. The system of claim 13, further comprising first computer-executable instructions to:
   determine, based on the first frame of the video data and one or more second algorithms, a first characteristic of the first frame of the video data; and
   determine that a second characteristic associated with the first pose data differs from the first characteristic;
   wherein the authorization is acquired in response to the first characteristic differing from the second characteristic.

16. The system of claim 13, further comprising first computer- executable instructions to:
   determine, based on one or more second frames of the video data and the first algorithm, third pose data indicating one or more third poses of the user;
   present a user interface that includes a representation of the first frame and the one or more second frames; and
   receive user input that indicates the first frame to authorize sending the at least a portion of the first frame to the second computing device.

17. The system of claim 13, further comprising first computer-executable instructions to:
   determine a portion of the first pose that is associated with a confidence value less than a threshold value;
   determine a portion of the first frame of the video data that corresponds to the portion of the first pose; and
   present a second output indicative of the portion of the portion of the first frame;
   wherein the authorization is acquired in response to the second output.

18. The system of claim 13, wherein the second computing device comprises:
   one or more second memories storing second computer-executable instructions; and
   one or more second hardware processors to execute the second computer-executable instructions to:
      receive from the first computing device the one or more of the at least a portion of the first frame of the video data or the data determined based on the at least a portion of the first frame;
      determine the second pose data based on the first frame and a second algorithm that differs from the first algorithm; and
      send the second pose data to the first computing device.

19. The system of claim 13, wherein the second computing device comprises:
   one or more second memories storing second computer-executable instructions; and
   one or more second hardware processors to execute the second computer-executable instructions to:
      determine training data based on the one or more of the at least a portion of the first frame of the video data or the data determined based on the at least a portion of the first frame;
      use a machine learning system to determine a second algorithm based on the first algorithm and the training data; and
      send the second algorithm to the first computing device.

20. The system of claim 13, further comprising first computer-executable instructions to:
   before sending to the second computing device the one or more of the at least a portion of the first frame or the data determined based on the at least a portion of the first frame, determine a second output based at least in part on the first pose data; and
   in response to receiving the second pose data, determine the first output based on the second output and the second pose data.

* * * * *